UNITED STATES PATENT OFFICE.

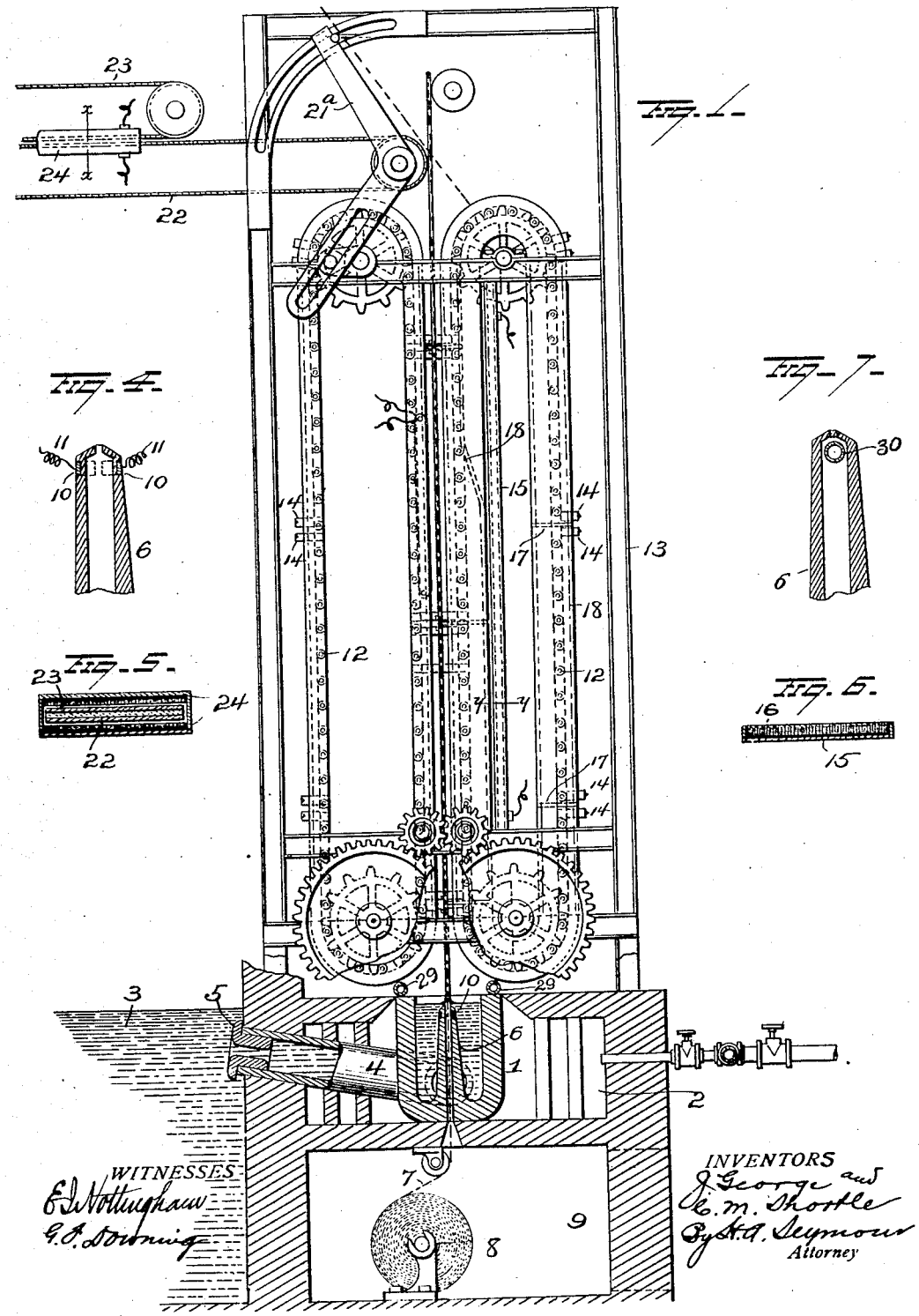

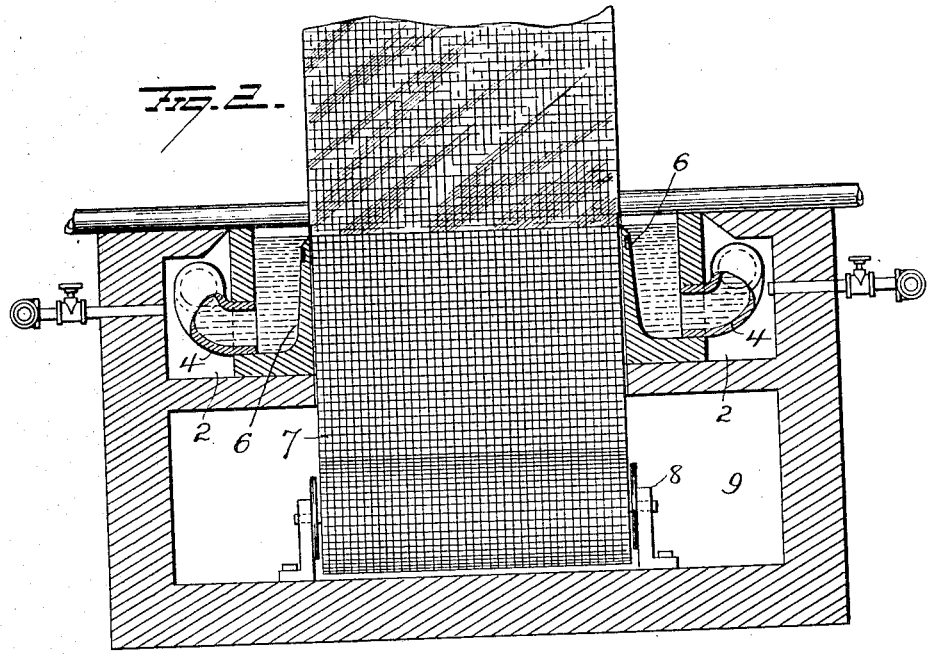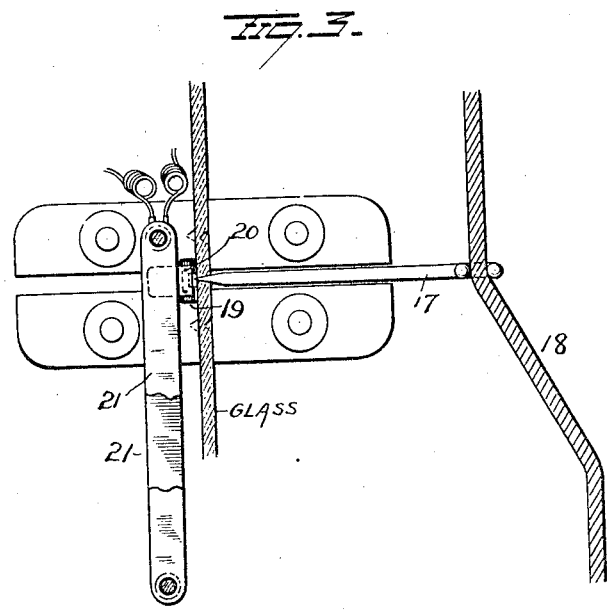

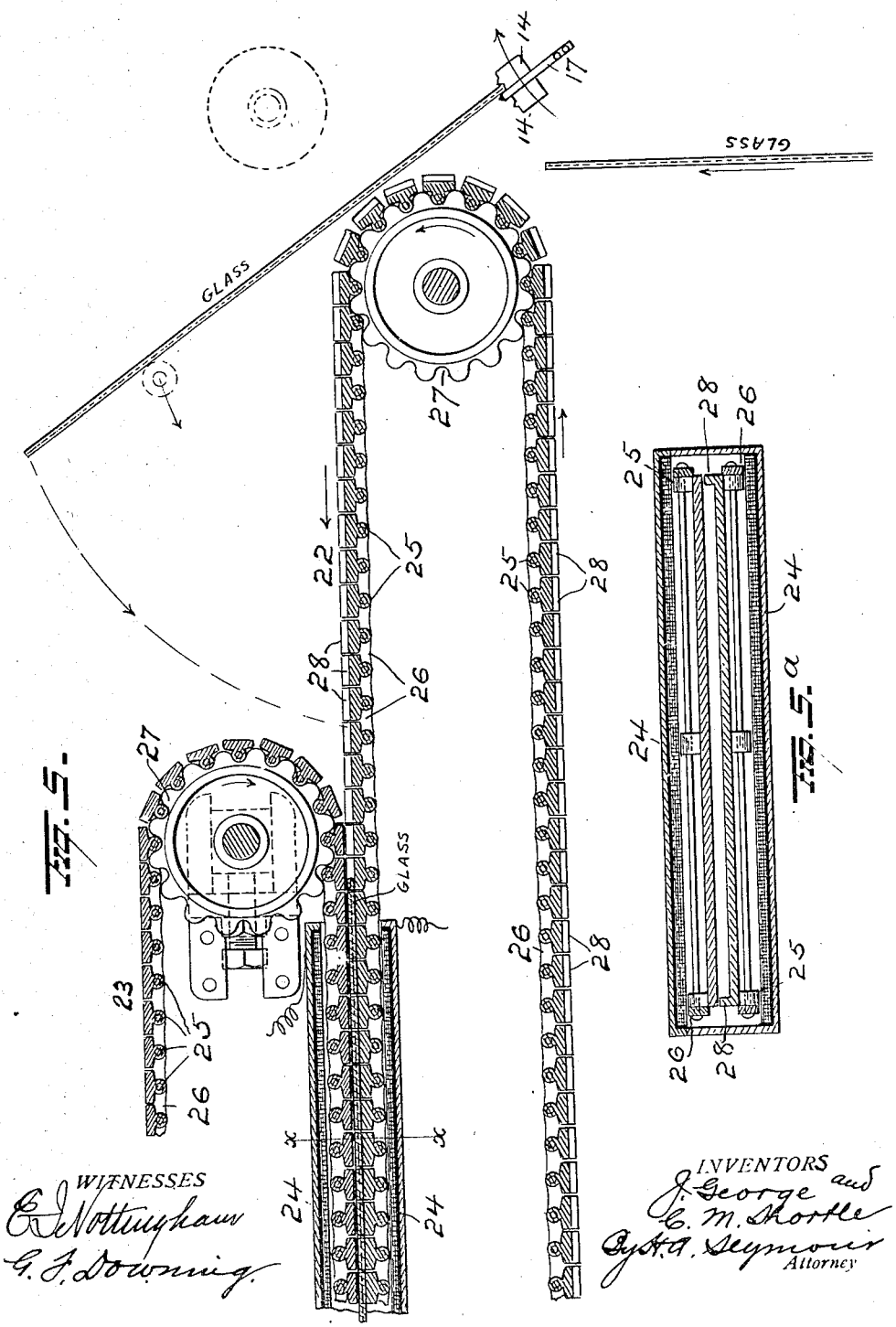

JAPHUS GEORGE, OF WILCOX, PENNSYLVANIA, AND CHRISTOPHER M. SHORTLE, OF BERN-HARDS BAY, NEW YORK.

MACHINE FOR MAKING WIRE-GLASS.

No. 891,924.　　　Specification of Letters Patent.　　Patented June 30, 1908.

Application filed May 29, 1906. Serial No. 319,313.

*To all whom it may concern:*

Be it known that we, JAPHUS GEORGE, of Wilcox, in the county of Elk and State of Pennsylvania, and CHRISTOPHER M. SHOR-TLE, of Bernhards Bay, in the county of Oswego and State of New York, have invented certain new and useful Improvements in Machines for Making Wire-Glass; and we do hereby declare the following to be a full, clear, and exact description of the invention, such as will enable others skilled in the art to which it appertains to make and use the same.

Our invention relates to an improved machine for making wire glass, the object of the invention being to provide an improved drawing pot through which the wire netting can be drawn and be evenly coated with glass.

A further object is to provide improved mechanism for drawing the wire glass, improved means for maintaining the glass at the proper temperature, improved means for cutting the glass into lengths, and improved means for annealing the glass in transit.

With these and other objects in view, the invention consists in certain novel features of construction and combinations and arrangements of parts as will be more fully hereinafter described and pointed out in the claims.

In the accompanying drawings, Figure 1 is a view partly in elevation and partly in section illustrating our improvements. Fig. 2 is an enlarged view in section of the drawing pot, taken at right angles to Fig. 1. Fig. 3 is an enlarged detail view of the cutting means. Figs. 4, 5, 5ª and 6 are views of details of construction and Fig. 7 is a modified form of draw pot nozzle.

1 represents our improved drawing pot which is mounted in the heating chamber 2 and supplied with molten glass from the supply chamber 3, by tubes 4 communicating with the ends of pot 1 and in the inlet ends of these tubes 4, plugs 5 are located and have openings therein to admit the glass. These plugs can be replaced by others having smaller or larger openings according to the flow desired or can be replaced by solid plugs when the flow is to be cut off.

The drawing pot 1 is made with an integral elongated nozzle 6 extending from its bottom up to a point approximating the normal level of glass in the pot and the wire netting 7 is drawn from a reel 8 supported in a chamber 9 below the pot, up through the nozzle 6 to receive, at the upper end of the nozzle, its proper coating of molten glass. Around the upper end of nozzle 6 an insert of material of high electrical resistance is located as shown at 10, and connected in an electric circuit by wires 11, so that the upper end of the nozzle will be maintained at the proper temperature to prevent chilling the glass.

The wire glass is drawn upward between endless conveyers 12 supported in a suitable framework 13 and provided with fingers or prongs 14 to grasp the glass and carry it upward. Beside the vertical portion of the heaters in the path of the moving glass, an electrical heater 15 is located to maintain the glass at proper temperature. This heater may be made in various ways, one structure being illustrated in cross section in Fig. 6 and comprises an insulated receptacle for a filler of material of high electrical resistance 16 connected in an electric circuit to maintain the proper temperature about the glass.

The chains at one side carry cutters 17 at regular intervals to sever the glass into proper lengths. These cutters move on a track 18 which normally holds them out of the path of the glass, and at the point of severance, the tracks bend sharply to force the cutters through the glass. On the opposite chains, at regular intervals to register with the cutters, electrical heaters 19 are supported to heat the glass before being severed. These heaters 19 are made with metal contacts or brushes 20 which slide on metal contact bars or rails 21 to cause said heater to soften the glass entirely across the sheet to facilitate its severance by the cutters. The bars or rails 21 are located adjacent to the path of the moving glass and the electric circuit of all the heaters 19 will be closed as they near the point of cutting to soften the glass at these points and as they pass this point the brushes 20 will move off the contact bars or rails and the electric circuit will be broken. The severed sheet of glass will then be tilted by the bell-cranks 21ª onto a conveyer 22 carried below an endless belt 23 and while supported in this horizontal position is moved through an electric heater 24 to anneal or harden the glass.

The belts or conveyers 22 and 23 and heater 24 constitute an annealing leer shown in detail in Figs. 5 and 5ª. The belts or conveyers each comprise a series of blocks or plates having lugs 25 connected by links 26 and form in effect sprocket chains moved by sprocket wheels 27. These blocks or plates in rounding the sprocket wheels are free to separate and when they reach a horizontal position present a flat surface to receive the glass. The ends of the plates of the lower conveyer 22 are provided with upturned flanges 28 which space the conveyers apart and form an inclosed chamber or table for the sheets of glass and hold the latter in proper position while passing through the heater to be perfectly annealed.

Heretofore wire glass furnished to the trade has a clouded or more or less opaque appearance, while the glass manufactured by our improvements will be perfectly clear and can be highly polished like any ordinary plate glass.

In the drawings we have shown cooling pipes 29 at the edges of the drawing pot and as shown in Fig. 7 a cooling pipe 30 is located in the nozzle when the apparatus is to be used for the manufacture of ordinary plate glass.

The details of the several electrical heaters may of course be varied and any construction of material which will do the work may be employed and a great many changes might be made in the general form and arrangement of the parts described without departing from our invention, and hence we do not restrict ourselves to the precise details set forth but consider ourselves at liberty to make such slight changes and alterations as fairly fall within the spirit and scope of our invention.

Having fully described our invention what we claim as new and desire to secure by Letters-Patent, is:—

1. In a machine of the character described, the combination of a heating chamber, a melting pot located therein, and means for drawing a wire netting through the bottom of the heating chamber and melting pot to coat the same with glass and give it a natural polished surface.

2. In a machine for making wire glass, the combination with a drawing pot, of an elongated nozzle extending up from the bottom of the pot and through which the wire is drawn, tubes connecting the ends of the pot with the source of glass supply, and removable plugs in said tubes to govern the flow of glass to the pot.

3. In a machine for making wire glass, the combination with a drawing pot, of a central elongated nozzle extending up from the bottom of the pot and terminating at the glass level in the pot, means for supplying molten glass to the pot, a reel of wire netting below the pot, and means for drawing the wire netting up through the nozzle to receive a coating of glass thereon.

4. In a machine for making wire glass, the combination with a drawing pot, of means for drawing a wire netting therethrough to receive a coating of glass, movable cutters to sever the glass into sheets, an electric heater to maintain the glass at proper temperature in transit, and another electric heater to soften the glass at the point of cutting.

5. In a machine of the character described, the combination with means for drawing glass, of cutters carried by said means, fixed electric contact rails, fixed devices for moving the cutters through the glass, said devices located opposite the contact rails, electric heaters carried by the glass drawing means and brushes or contacts on said heaters to engage the contact rails and connect the electric heaters in circuit to heat the glass at the point of cutting.

6. In a machine of the character described, the combination with a drawing pot, of a nozzle therein through which the wire is drawn, an electric heater around the nozzle, means for drawing the glass up, an electric heater to heat the glass in transit upward, cutters to sever the glass into sheets, electric heaters to soften the glass at the point of cutting, a pair of horizontal conveyers, means for tilting the sheets onto the lower conveyer to be carried between the conveyers and an electric heater through which the glass sheet is carried by the conveyers to anneal the same.

7. The combination with means for drawing a glass sheet, a heater arranged to travel with the glass sheet and to heat the same on a line transversely of the sheet, and means for severing the sheet on the line thus heated.

8. The combination with conveyers for drawing a glass sheet, of a heater carried by one of said conveyers and disposed transversely of the sheet to heat the same on a severing line, and means for severing the sheet where it is thus heated.

9. The combination with means for drawing a glass sheet, and severing means, of an electric heater disposed transversely of the sheet where the latter is to be severed by said severing means and means for closing the circuit of said heater before the severing means is reached, whereby the sheet will be softened on a transverse line to be operated upon by the severing means.

10. The combination with a glass pot and a conveyer to draw a sheet of glass and a sheet of wire netting simultaneously from said glass pot, of a cutter for severing the sheet transversely, and means for heating the sheet on a transverse line to be operated upon by the cutter in severing the sheet.

11. The combination with means for drawing a wire glass sheet, of a cutter for severing the sheet transversely, means for heating the sheet on the severing line, and means for actuating said cutter.

12. The combination with means for drawing a sheet of wire glass and a cutter for severing the same transversely, means for actuating the cutter, and an electric heater to travel with the sheet and heat it on the severing line.

13. In a machine for drawing and annealing glass, the combination with means for drawing a glass sheet, of parallel electric heaters, and means for passing the sheet between said electric heater for annealing said sheet.

14. In an apparatus of the class described, the combination with a receptacle for molten glass, of means for drawing glass therefrom, means for embedding a reinforcing structure in the glass as drawn, and means automatically operated at predetermined intervals for severing the drawn glass and reinforcing structure.

15. In an apparatus of the class described, the combination with a receptacle for molten glass, of means for drawing glass therefrom, means for embedding a reinforcing structure in the glass, and means for severing the drawn glass and reinforcing structure, said latter means comprising two members between which the drawn glass and reinforcing structure pass, the members being constructed and arranged to sever the glass from opposite sides while one of the members constitutes a cutting block upon which the other member severs the reinforcing structure.

16. In an apparatus of the class described, the combination with a receptacle for molten glass, of means for drawing glass therefrom, means for embedding a reinforcing structure in the glass as drawn, means automatically operated at predetermined intervals for severing the drawn glass and reinforcing structure into sections, a leer, and means for introducing the several sections into the leer.

17. In an apparatus of the class described, the combination with a receptacle for molten glass, of means for drawing glass therefrom, means traveling with the drawn glass for heating it on a predetermined line, and means for severing it on this line.

In testimony whereof, we have signed this specification in the presence of two subscribing witnesses.

JAPHUS GEORGE.
CHRISTOPHER M. SHORTLE.

Witnesses:
S. G. LATTA,
F. W. ALDRICH.